Jan. 8, 1935.  C. A. LAEMMEL  1,986,933
KNIFE FOR FOOD CHOPPERS
Filed Sept. 3, 1932
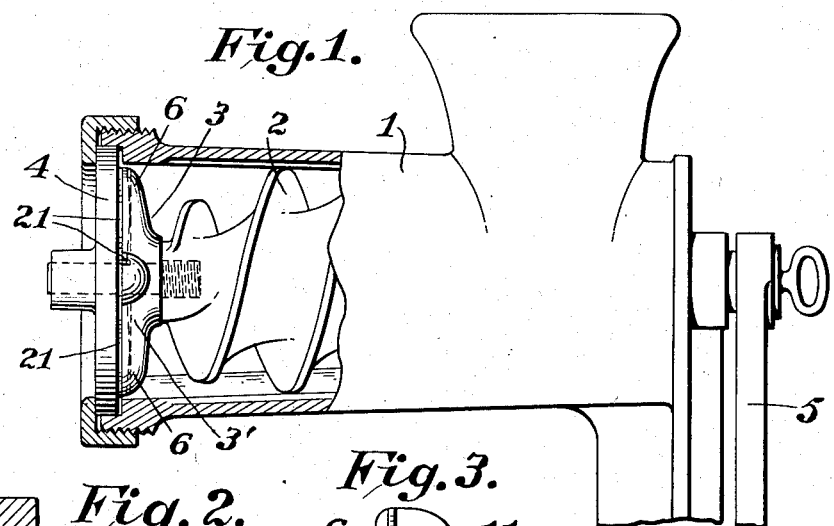
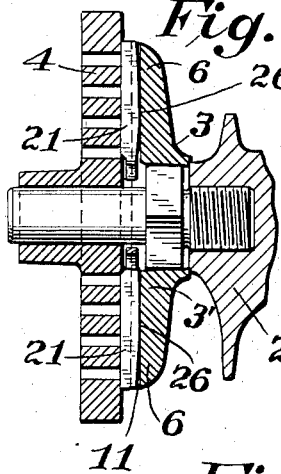
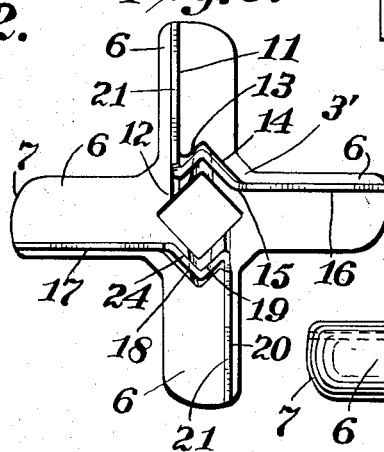
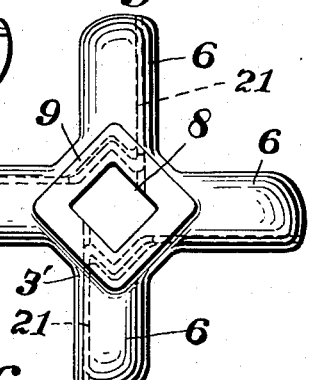
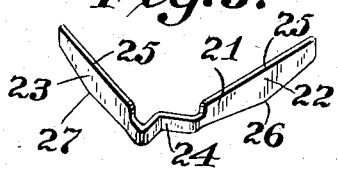
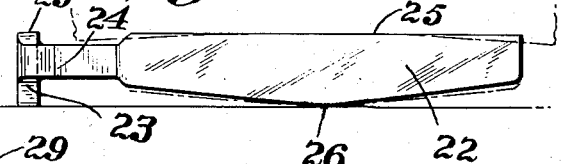
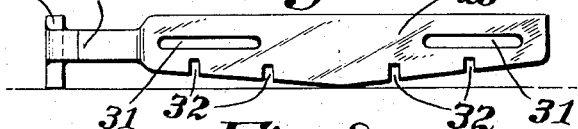
Inventor:
Charles A. Laemmel,
By Parker Cook
Attorney.

Patented Jan. 8, 1935

UNITED STATES PATENT OFFICE 1,986,933

KNIFE FOR FOOD CHOPPERS

Charles A. Laemmel, Brooklyn, N. Y., assignor to Atlantic Service Company, Inc., Brooklyn, N. Y., a corporation of New York Application September 3, 1932, Serial No. 631,721

12 Claims. (Cl. 146—189)

My invention relates to new and useful improvements in knives for meat cutters, and more particularly to a knife comprising a carrier or frame having renewable blades which may be quickly replaced within the carrier and quickly removed therefrom when worn.

Still another object of the invention is to provide a knife for meat cutters wherein the blades within the carrier are self-aligning, so that the cutting edges of all the blades will lie flat against the plate and the meat will thus be sharply cut rather than torn or ground.

As is well known to those skilled in the art of meat cutters, the pressure is generally applied to the blade or knife near its inner end and the pressure gradually diminishes as it reaches the outer end of the blade.

Now, due to the fact that the blade is, of course, very hard, it cannot accommodate itself to any wear in the plate, with the result that it is apt to bridge over the worn parts of the plate and thus tear or crush the meat, rather than cut the same sharply. This condition continues until the knife grinds itself into the irregularities of the plate, the time depending, of course, on the hardness of the blade. Most butchers knowing this, therefore, increase the pressure against the knife to a point where the knife will spring out of shape, resulting in further damage to the plate or the machine itself.

Another object of my invention, therefore, is to provide a knife in the form of a carrier or frame in which is to be sprung the blades, as will be hereinafter set out, which blades are slightly convex on their rear edges, so that when the knife is placed in the machine the pressure is exerted on the blades about centrally of their length or, in other words, at a point somewhat remote from the central axis of the carrier or frame. Thus, the blade may rock slightly and properly align or accommodate itself to a worn plate. In other words, each blade is self-aligning and will contact throughout its length with the plate when pressed up against the same, even though the plate be worn from usage.

Still another object of the invention is to provide a meat cutter knife wherein the blades are inserted by simply slightly compressing a pair of them in the fingers and placing them within receptive grooves within the carrier or frame, this means of holding doing away with the more expensive and troublesome form of lugs or screws as used in the conventional type of carrier.

Still another object of the invention is to provide a knife for food choppers wherein the blades may be hardened to the degree found most satisfactory, and wherein the carrier or frame may also be heat-treated to give the greatest rigidity. Furthermore, due to the construction of the blades and their receptive grooves in the carrier, any distortion that might take place during the heat treatment of either the blades or the carrier will be nullified by the self-aligning character of the blades.

With these and numerous other objects in view which will more readily appear as the specification proceeds, the invention consists in certain new and novel arrangements and combination of parts, as will be hereinafter more fully described and pointed out in the claims.

Referring now to the drawing showing a preferred embodiment and two slight modifications, Fig. 1 is a side elevation, partly in section, of a meat chopper having the present invention embodied therein;

Fig. 2 is an enlarged sectional view showing the knife in position against the perforated plate;

Fig. 3 is an enlarged face view of the carrier or frame with the blades fitted within the receptive grooves of the frame;

Fig. 4 is a back view of the carrier or frame;

Fig. 5 is a perspective of one of the knife blades;

Fig. 6 is a diagram showing the flexing of the blade to compensate for wear in the plate;

Fig. 7 is a view of a slightly modified type of blade to increase flexibility; and Fig. 8 is a detail end view of a still further modification of a blade of bent formation.

Referring now more particularly to the several views, there is shown a conventional type of meat chopping machine 1, with the screw or helix 2 therein which, at its outer end, bears against the rear of the knife 3 which, in turn, bears against the inner surface of the usual perforated plate 4. The helix and knife, of course, are revolved through the medium of the handle 5.

The parts above-mentioned are conventional with the exception of the knife, which will be described more in detail.

Referring now for the moment to Figs. 3, 4 and 5, it will be seen that the knife 3 consists of the carrier or frame 3', having the four outstanding arms 6 which are spaced in right angular position, while the outer edge of the respective arms may be slightly rounded, as at 7. There is the hub 8, which may be reinforced, as at 9, in the usual manner.

It will be understood that a carrier or frame with a different form of hub might likewise be utilized, and it will also be understood that in the specification where the word "knife" occurs, it designates the ensemble of the frame with its blades.

On the under surface of the frame will be seen the receptive grooves for the accommodation of the blades and, as may be seen in Fig. 3, a groove 11 is shown, extending from the outer edge of the one arm inwardly to the point 12, where it again extends upwardly and outwardly to the point 13, which point is opposite an angle formed by the walls of the square hub. The groove then extends downwardly, as at 14, and merges at the point 15 with the groove 16, where it again extends outwardly to the end of the adjacent arm of the carrier.

In a like manner (Fig. 3), there is a groove 17 in a similar arm, that extends inwardly parallel with its arm and downwardly, as at 18, upwardly, as at 19, and then downwardly, as at 20, in the arm adjacent the arm just mentioned.

In other words, the blades being formed in pairs will be received in radially receptive grooves, there being a continuous groove for each two of the arms.

Referring now for the moment to the removable blades 21, a pair of which is shown in Fig. 5, it will be understood that for each carrier or frame there will be two pairs of blades. Preferably, a pair of blades is formed by taking a piece of sheet metal and striking it to the shape shown by the proper dies. The sheet metal may be of suitable steel and heat-treated and then tempered to the degree of hardness found most preferable; or the blades may be made of high-quality high-speed tool steel and shaped by forging.

A pair of blades consists of the blade 22 and the blade 23 that extend at a ninety degree angle thereto, which is the angle of the receptive grooves in the arms of the carrier or frame.

I have found that in hardening these blades, they have a slight tendency to open, that is, when the blades are in the soft state, they are at an angle of ninety degrees but after the hardening, the angle is apt to be ninety-one or ninety-two degrees. This slight opening of the blades has an advantage, in that when they are compressed slightly with the fingers and placed within the receptive grooves in the carrier, they will be frictionally held within the grooves until such time as the knife is placed in the meat chopper where, of course, the blades will be tightly held by compression against the plate and tightly within the grooves of their carrier or frame.

It will be further seen that the blades are reduced slightly where the two blades of the pair merge, that is, at the bridge 24, and it will also be seen that the angularity of the bridge of the blades conforms in shape to the angularity of the grooves in the carrier where they encircle the respective angles of the hub. Thus, when each pair of blades is placed within its grooves in the carrier, it is encompassed throughout its entire length by the walls of its respective grooves.

Now the upper edges 25 or, in other words, the cutting edges, of these blades are in a plane surface, whereas the lower or opposite edges of the blades are slightly convex and each blade has its respective high point, such as at 26 and 27.

As shown in the enlarged detail, Fig. 6, each blade, therefore, will rest in its groove on its high point, and when the blades are inserted, as may be seen in Fig. 2, the pressure on the blades will be substantially midway their length, rather than wholly at their inner ends, which is apt to be true with the conventional form of cutters now in use.

It will be noticed that the metal bridging the two blades is relatively thin and reduced with relation to the depth of the blades. Thus, when pressure is applied to the blades through the medium of their carrier, any irregularity or angularity in the plate will be overcome, as the pressure through the carrier to the blades will cause them to rock or pivot slightly on their high spots, the metal forming the bridge giving slightly, so that the blades will align themselves throughout their length and thus contact perfectly with the surface of the worn plate.

As heretofore mentioned, it is desirable that the cutting edges of the blade contact throughout their length with the perforated plate of the meat chopper, so that the meat will be cut sharply and cleanly, rather than crushed or ground, which so often happens when a conventional type of cutter is used, due to the fact that the plate becomes worn from use by the continuous movement of the knives about the plate.

It will be noticed that by making these interchangeable blades in pairs, and by forming the radial grooves as shown, the blades can be held in place without the further use of screws or dowels and lugs. Furthermore, it is not necessary to use any tools for the insertion or removal of the blades from the carrier or frame.

It will also be noticed that these blades are of the same thickness throughout their height, so that when they are re-ground or sharpened, they still maintain the same thickness or width of cutting edge as they had in the beginning.

I have also found that by forming a carrier or frame as shown, the same may be heat-treated to the proper hardness, and any slight distortion that takes place during the heat treatment is overcome by having the knives or blades convex on their bottom surface, as the blades will thus properly seat or align themselves with relation to the plate when the knife is placed in the food chopper.

In the same manner, any slight distortion in the treatment of the blades is overcome by the aligning feature of the blades.

Thus, the knife will have as much strength as the solid type while, at the same time, it is not necessary to overcome any distortion by grinding, which is expensive and which has to be done in so many cases in the solid type or form of knife that is in use today.

In Fig. 7, there is a slight modification shown to enhance the flexibility of the blade. In this instance there is the reduced bridge 28 connecting the integral blades 29 and 30, in which there are the elongated slots 31, while the niches 32 are formed in the under edges of the blades. It will be understood also that there are two pairs of blades used in each carrier, otherwise the blades are similar in all respects to the blades shown in the preferred form.

Likewise, in another modification shown in Fig. 8, I have shown how the blade 33, rather than extending at right angles to its plate 34, might be bent throughout its length, as at 35, and extend downwardly, as shown at 36, to thus contact with its plate at an angle less than ninety degrees, as shown in the preferred type.

It will also be understood that the bottom wall of the grooves might be of convex shape and the lower edge of the blades made flat, which is just opposite from a convex lower edge blade and a flat bottom wall groove, but this reversal of parts is so obvious that it is not thought necessary to show it in the drawing, and it will be noticed that I prefer the arrangement described and shown.

From the foregoing, it will be seen that I have provided a type of knife having renewable blades that will have the same strength and rigidity as the solid form of meat chopper knife, but which overcomes the many objections pointed out that are inherent to the solid form of knife.

Each blade of the pair is self-aligning, so that even though the plate becomes worn or distorted, the cutting edge of the blade will, at all times, contact throughout its length with the plate, while a screwing up of the knife against the plate will not further distort or wear the plate, as formerly was the case with the solid form of knife of the conventional type.

Finally, by having the pressure applied to the relatively thin blades, at a point about centrally of their length, the blades may bend slightly edgewise should the plate be worn hollow, to thus insure the proper contact of the blades with the plate, which result could not be accomplished in the old form of knife where the pressure is applied centrally of the frame or, in other words, at the inner adjacent ends of the knife blades.

Having thus described my invention, what I claim as new and desire to secure by Letters Patent is:

1. A pair of integral knife blades for a food chopper formed of relatively thin metal and consisting of two blades extending substantially at right angles to each other throughout their cutting length, the said blades being reduced and deflected from a right angle at their points of merger and a bridge of resilient nature connecting the two blades so that the said blades may be springingly forced slightly toward or away from each other.

2. A pair of integral blades for a meat chopper consisting of a reduced bridge portion of irregular shape, two right angularly extending blades, their cutting edges presenting plane surfaces and their under edges extending downwardly from their opposite ends towards their center, and the said blades formed with openings to enhance their flexibility.

3. A pair of knife blades for a meat chopper consisting of two right angularly positioned cutting blades, a flexible bridge of reduced portion connecting said blades, the bridge portion being of irregular shape and adapted to encircle a portion of a wall of the hub of a carrier, the blades being capable of being sprung slightly towards each other, the under surfaces of the blades extending downwardly from their ends towards the center and the said blades being capable of a slight rocking movement with respect to each other when forced against the plate of a meat cutter.

4. A knife for meat choppers including a carrier having radial arms which, in turn have receptive flat bottom grooves in their under surfaces, removable blades fitting in the receptive grooves, the ends of the blades of less depth than the central portions thereof to produce a convex under surface to contact with said flat bottom grooves whereby the blades will properly align themselves when held adjacent the plate of a food chopper.

5. A knife for meat choppers including a carrier having radial arms, a receptive flat bottom groove dividing the arms in pairs, the grooves formed on the under surfaces of said arms, a pair of blades fitting in each pair of grooves, the top surfaces of the blades being flat while the opposite surfaces of the blades are convex longitudinally whereby the blades may slightly rock within their grooves longitudinally to properly contact throughout their length with the plate of a meat chopper when forced against said plate.

6. A knife for meat choppers including a carrier or frame having four radial arms, a receptive groove extending radially of one arm and then angularly and then radially of an adjacent arm to form a pair of grooves, the two remaining arms being also likewise provided with a similar groove, blades connected by a bridge to form a pair, and a pair of blades in each of the pair of grooves, the bridge connection between the respective blades resiliently holding the respective blades in the respective pair of grooves, the under surface of each blade being slightly convex longitudinally whereby the blades will all properly align themselves with respect to the plate of a food chopper when pressed thereagainst.

7. A pair of integral blades for a food chopper, a resilient bridge between the said blades, the top surfaces of the blades being relatively flat and the under surfaces of the blades being reduced in depth at their ends to produce a convex under surface, the bridge being slightly reduced and adapted to partly encircle the walls of a hub of a carrier for said blades.

8. A pair of integral blades for a meat chopper consisting of two relatively thin blades positioned at right angles to each other and connected by a bridge extending in a plane below the cutting edges of said blades, the said bridge also being of irregular outline and adapted to encircle a portion of the walls of a hub of a carrier or frame, and the under surfaces of the blades being reduced in depth at their ends to thereby provide a convex under surface longitudinally of the blades.

9. A pair of integral blades for a meat chopper consisting of a reduced bridge portion of irregular shape, the two blades extending angularly with relation to each other, the top surfaces of the blades being relatively flat, and the under surfaces of the blades reduced in depth at their ends to form the blades convex throughout their length.

10. A pair of relatively thin blades for a meat chopper having an integral connecting bridge of irregular shape, the said bridge extending in a plane below the cutting edges of the blades and above the bottom edges of said blades, the blades capable of being slightly sprung toward or away from each other and rocked slightly with relation to each other, the rocking movement of the blades compensated for in the bridge structure.

11. A knife for meat choppers including a carrier or frame, the latter having grooves therein, a pair of blades connected by a bridge, the blades extending at right angles to each other and adapted to be pressed within the grooves of the carrier or frame and springingly held therein, the under contacting surfaces of the blades with the bottoms of the grooves presenting uneven cooperating surfaces to thus permit a slight rocking of the blades and permitting them to properly align themselves when forced against the plate of a meat chopper.

12. A knife for meat choppers including a frame having a central hub and radial arms extending from the hub, grooves in the arms and about said hub, a pair of cutting blades having a bridge, the bridge and blades frictionally and springingly held within said grooves, the bottoms of the grooves and the under surfaces of the blades presenting points of contact rather than of flat surfaces whereby the blades may align themselves properly when forced against the plate of a meat chopper.

CHARLES A. LAEMMEL.